United States Patent
Weller

[11] Patent Number: 6,068,297
[45] Date of Patent: May 30, 2000

[54] FRAME FOR A BELT RETRACTOR OF A VEHICULAR SEAT BELT SYSTEM

[75] Inventor: Hermann-Karl Weller, Alfdorf, Germany

[73] Assignee: TRW Occupant Restraint Systems GmbH, Alfdorf, Germany

[21] Appl. No.: 09/013,874

[22] Filed: Jan. 27, 1998

[30] Foreign Application Priority Data

Feb. 3, 1997 [DE] Germany ............... 297 01 841 U

[51] Int. Cl.⁷ .................. B60R 22/00; B60R 22/48
[52] U.S. Cl. .................. 280/801.1; 297/472
[58] Field of Search .................. 280/801.1, 805, 280/807; 242/379, 383.2; 52/702, 712; 403/232.1; 250/808; 297/471, 472

[56] References Cited

U.S. PATENT DOCUMENTS

| | | | |
|---|---|---|---|
| 3,444,962 | 5/1969 | Lech | 297/472 |
| 3,482,872 | 12/1969 | Chamberlain | 297/472 |
| 3,659,801 | 5/1972 | Romanzi, Jr. | 242/379 |
| 3,880,379 | 4/1975 | Booth | 242/379 |
| 4,141,573 | 2/1979 | Ellens | 280/801.1 |
| 4,825,614 | 5/1989 | Bennet et al. | 52/410 |
| 4,971,357 | 11/1990 | Nakasaki et al. | 280/801 |
| 5,423,507 | 6/1995 | Florent et al. | 248/300 |

FOREIGN PATENT DOCUMENTS

| | | |
|---|---|---|
| 0165621 | 12/1985 | European Pat. Off. . |
| 3125090 | 1/1983 | Germany .......... 242/379 |
| 3203502 | 8/1983 | Germany .......... 242/379 |
| 3308817 | 10/1983 | Germany .......... 242/379 |
| 3331272 | 3/1984 | Germany .......... 242/379 |
| 19510603 | 9/1996 | Germany . |

Primary Examiner—Brian L. Johnson
Assistant Examiner—M. Britton
Attorney, Agent, or Firm—Tarolli, Sundheim, Covell, Tummino & Szabo L.L.P.

[57] ABSTRACT

A frame for a belt retractor of a vehicular seat belt system includes two side parts, a rear wall connecting the side parts to each other, and a positioning strap having a first end connected to the rear wall and a second end. The second end is provided with a stiffening strip which in turn is connected to the rear wall.

10 Claims, 4 Drawing Sheets

FRAME FOR A BELT RETRACTOR OF A VEHICULAR SEAT BELT SYSTEM

The invention relates to a frame for a belt retractor of a vehicular seat belt system.

BACKGROUND OF THE INVENTION

Conventional belt retractor frames include two side parts, a rear wall connecting the side parts to each other and a positioning strap, the one end of which is connected to the rear wall. Since such belt retractors as well as their frames are known in the prior art, their configuration and function is only briefly explained here. The frame for a belt retractor comprises usually a U-shaped sheet-metal part, in the two side parts of which a belt reel is mounted on which the seat belt can be wound. The rear wall of the frame connecting the two side parts to each other is bolted usually to the body of the vehicle.

To facilitate fitting the belt retractor, a positioning strap may be provided on the rear wall of the belt retractor frame, this positioning strap being bent out of the plane of the rear wall to the side facing away from the side parts. This positioning strap is provided with an opening which may be mounted on a clip so that the belt retractor is provisionally positioned on the vehicle. This positioning strap is configured as a "flying tab", i.e. connected to the rear wall of the frame by one end only. It has been found out to be a drawback in this arrangement that the strength of the positioning strap is inadequate in the case of loads acting vertically to the rear wall of the frame. When, for example, the opening of the frames is not exactly mounted into position on the clip, the positioning strap may become distorted thereby. The positioning strap may also be distorted in transportation of the frame or belt retractor. Stiffening the positioning strap by beading or embossing has also turned out to be inadequate. Deep drawing the positioning strap is also possible only to a limited extent since due to deep drawing only a minor distance of the positioning strap from the plane of the rear wall is achievable. For another thing, it has turned out to be a drawback that the frames tend to become entangled by means of their positioning straps, especially during transportation.

BRIEF DESCRIPTION OF THE INVENTION

The invention provides a frame, the positioning strap of which is particularly rigid and cannot become entangled with the positioning strap of other frames. In accordance with the invention it is provided a frame for a belt retractor of a vehicular seat belt system, which includes two side parts, a rear wall connecting the side parts to each other, and a positioning strap having a first end connected to the rear wall and a second end. The second end is provided with a stiffening strip which in turn is connected to the rear wall. This stiffening strip may be simply stamped out the same material as used for the rear wall in fabricating the frame, i.e. no additional steps in production are involved and the weight of the frame is only slightly increased thereby. As compared to a deep-drawn positioning strap, using a stiffening strip results in a weight saving. Furthermore, the positioning strap reinforced by the stiffening strip can be bent out of the plane of the rear wall of the frame with very much less effort than in the case of a deep-drawn item.

Further features of the invention are set forth in the sub-claims.

BRIEF DESCRIPTION OF THE DRAWINGS

The invention will now be described with reference to two embodiments, illustrated in the drawing in which.

DETAILED DESCRIPTION OF THE INVENTION

Figure 1:
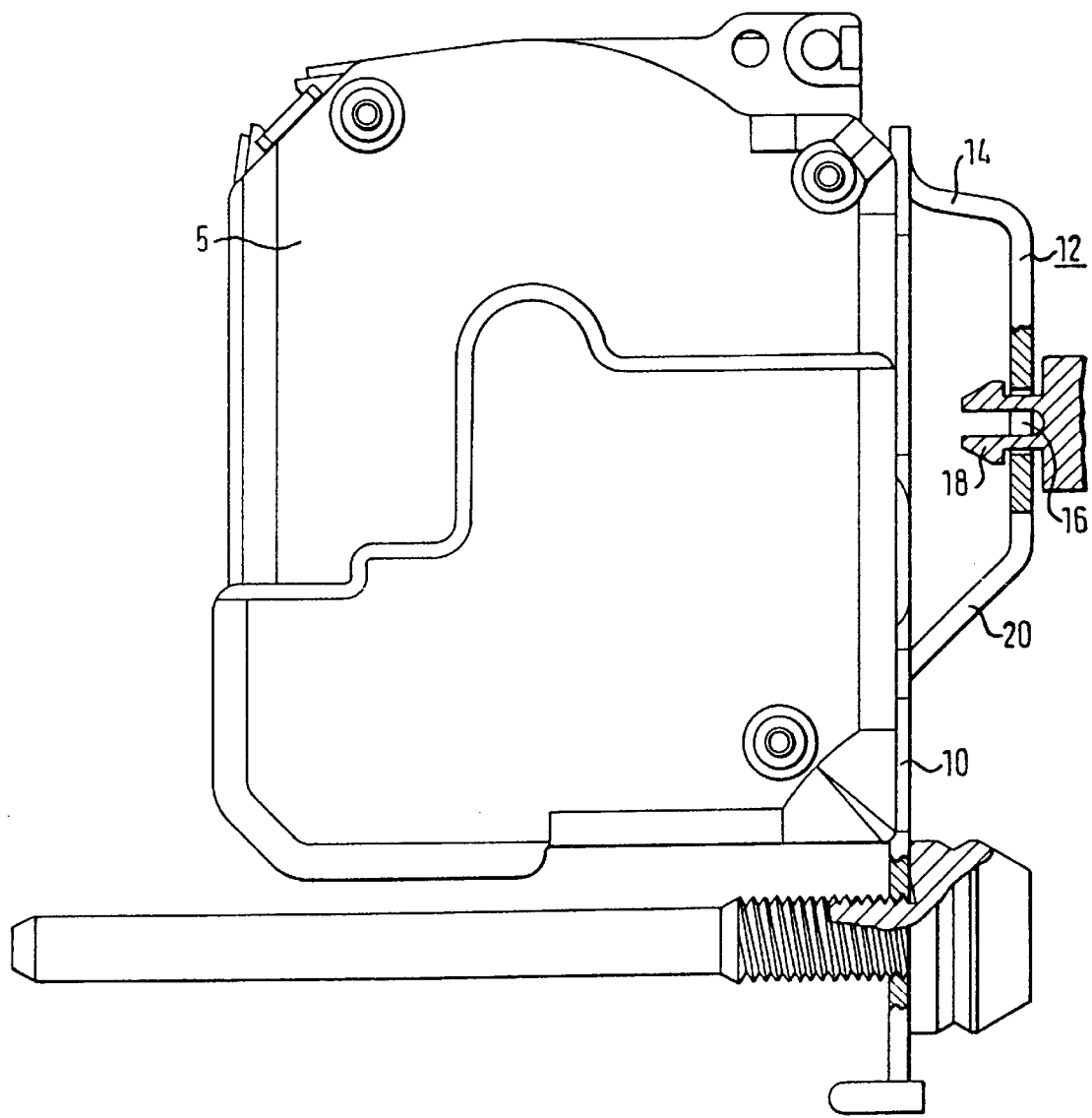
FIG. 1 is a schematic side view of a belt retractor provided with a frame in accordance with the invention.
Figure 6:
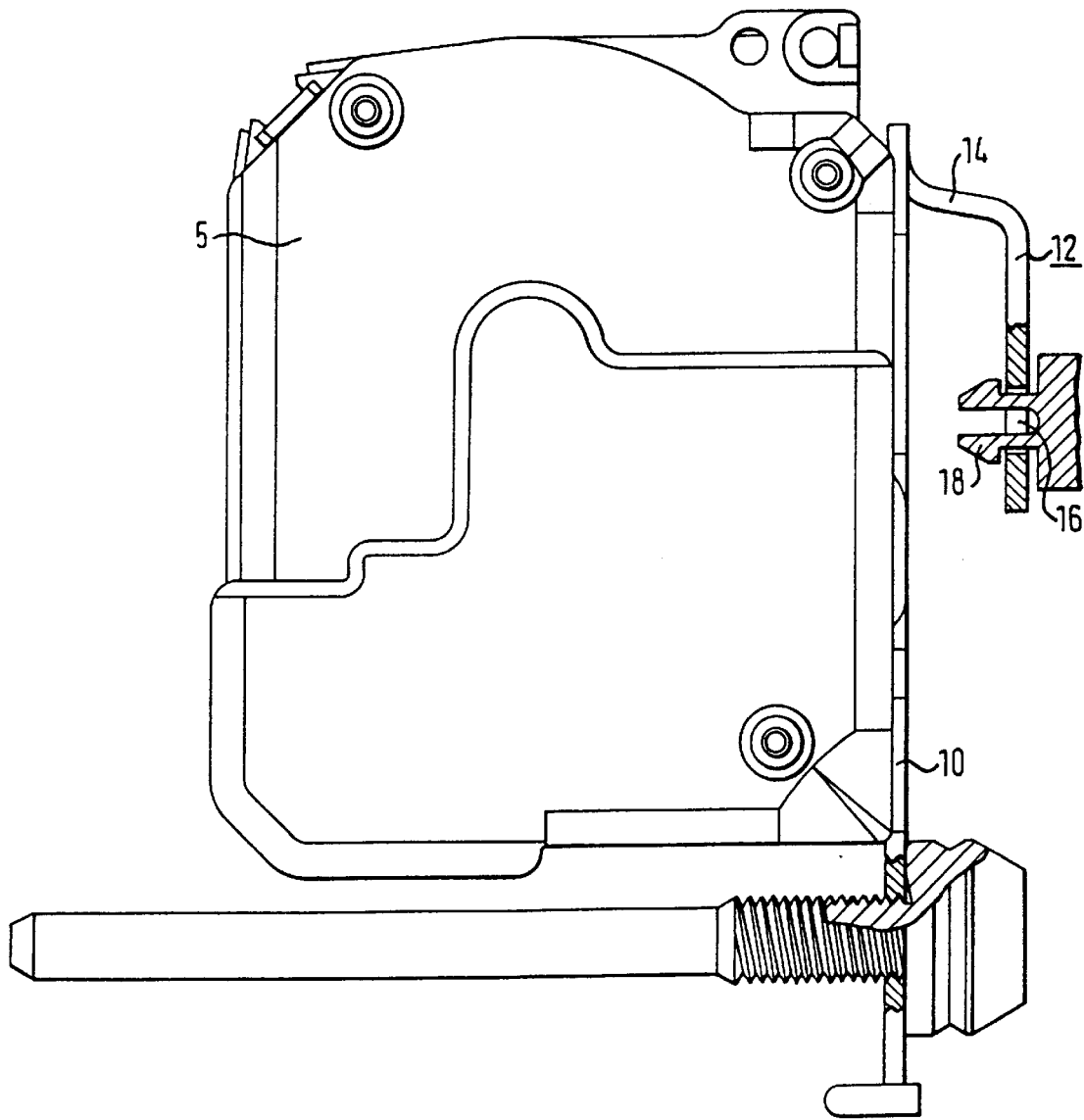
FIG. 6 is a schematic side view of a belt retractor including a frame according to prior art.

In FIGS. 1 and 6, a belt retractor 5 for a vehicular seat belt system is illustrated in a schematic side view. This belt retractor comprises a frame 7 (see also FIG. 2) of which in FIGS. 1 and 6 merely the rear wall 10 is evident. On the rear wall 10 a positioning strap 12 is formed, which is connected via a connecting portion 14 to the frame. In the case of Lhe frame according to prior art (see FIG. 6), only one end of the positioning strap 12 is connected to the frame. On the side of the positioning strap facing away from the connecting portion 14, an opening 16 is provided in which a clip 18 depicted schematically can engage to fasten the frame and thus the belt retractor during assembly to the vehicle.

In FIG. 1, a frame in accordance with the invention is illustrated. The difference to the frame according to the prior art shown in FIG. 6 is that the end of the positioning strap 12 facing away from the connecting portion 14 is connected to a stiffening strip 20. This stiffening strip 20 stabilizes the positioning strap 12 and prevents the positioning straps from becoming entangled when transporting several frames or belt retractors provided with the positioning strap 12. Due to the stiffening strip 20, each positioning strap 12 no longer features a free end capable of clasping another positioning strap.

Figure 2:
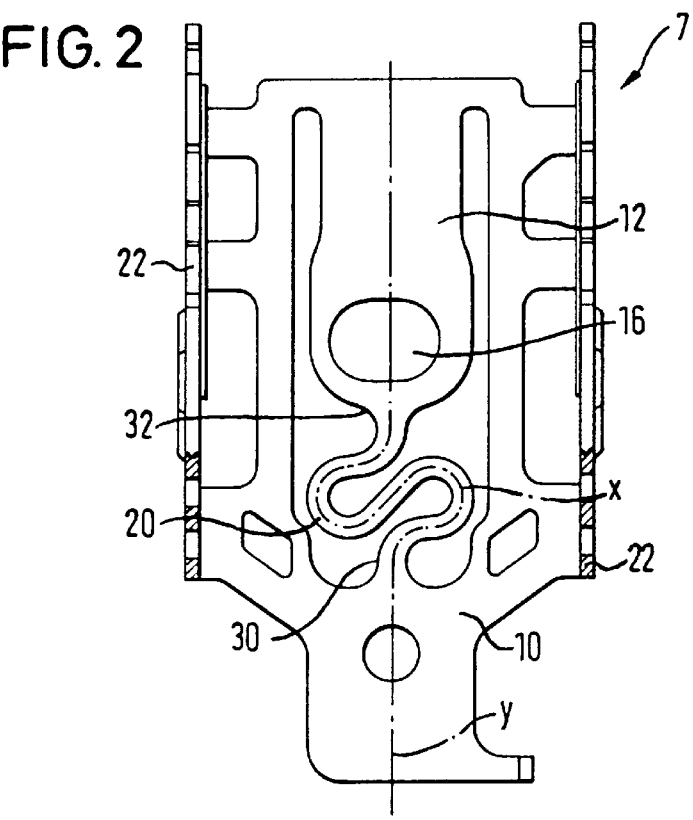
FIG. 2 is a schematic plan view of a frame in accordance with a first embodiment of the invention showing the positioning strap in a first condition.
Figure 3:
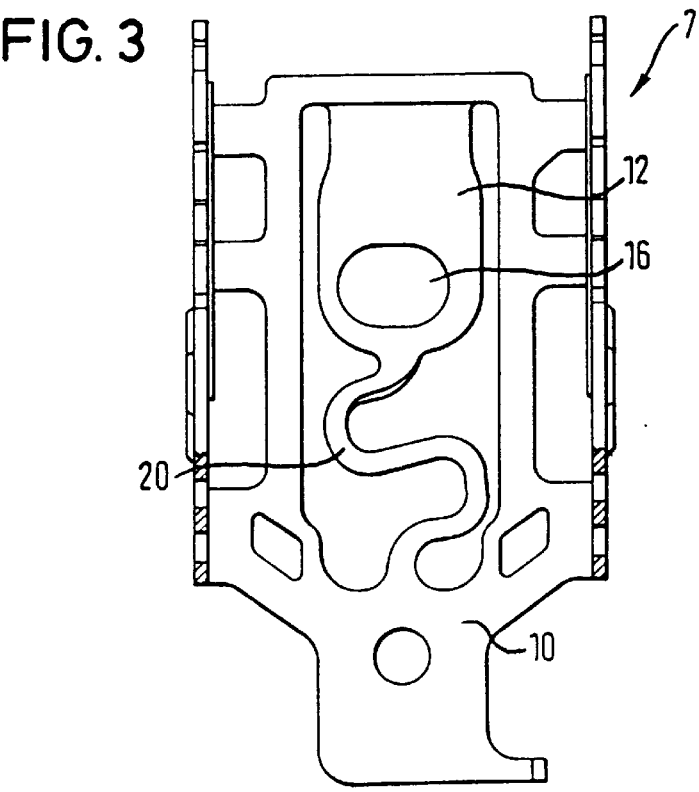
FIG. 3 shows the frame of FIG. 2 with the positioning strap in a second condition.
Figure 4:
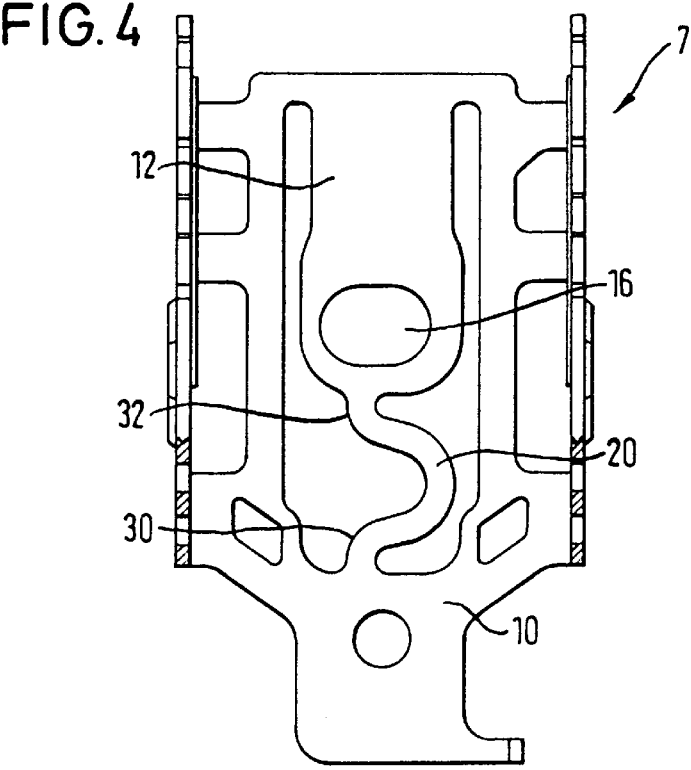
FIG. 4 is a schematic plan view of a frame in accordance with a second embodiment of the invention showing the positioning strap in a first condition.
Figure 5:
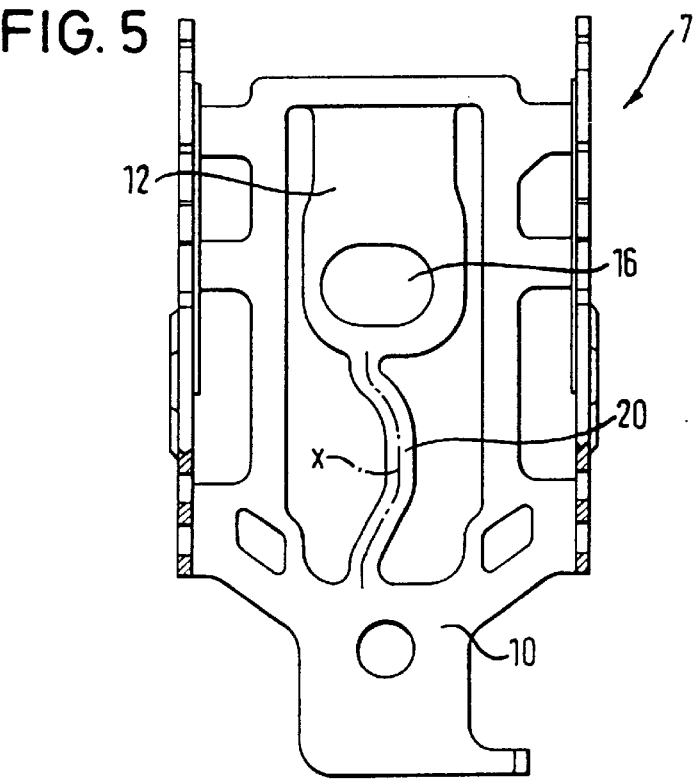
FIG. 5 shows the frame of FIG. 4 with the positioning strap in a second condition.

With reference to FIGS. 2 to 5, it will now be described how the positioning strap is transformed into the shape shown in FIG. 1 for the condition following stamping of the rear wall 10 of the frame 7, FIGS. 2 and 3 illustrating a frame in accordance with a first embodiment of the invention, and in FIGS. 4 and 5 a frame in accordance with a second embodiment of the invention is shown.

In FIG. 2 the frame 7 is evident with the rear wall 10 and two side parts 22 extending therefrom. In this illustration the side parts 22 extend perpendicularly to the plane of the drawing towards the observer. Together with the stiffening strip 20 the positioning strap 12 is stamped out of the material of the rear wall 10. Directly after stamping the positioning strap 12 extends together with the stiffening strip 20 in the same plane as the rear wall 10, this corresponding to the state as illustrated in FIG. 2. It is evident that the stiffening strip 20 extends meander-like between its end 30 connected to the rear wall 10 and its end 32 connected to the positioning strap 12, i.e. the centerline x of the stiffening strip 20 snakes about a centerline y of the rear wall 10. The length of the stiffening strip 20, as measured along the centerline x, is thus significantly longer than the distance between the end 30 and the end 32 of the stiffening strip 20 as measured parallel to the centerline y. Starting from this state, the positioning strap 12 is bent out of the plane of the rear wall, i.e. to the side facing away from the side parts. In the view as selected in FIG. 2 the positioning strap is thus bent perpendicularly to the plane of the drawing away from the observer. Simultaneously, the end 32 of the stiffening strip 20 connected to the positioning strap 12 is moved away from its end 30 connected to the rear wall 10, i.e. the stiffening strip 20 is stretched. In FIG. 3 the condition with the positioning strap 12 totally bent out is depicted, it being evident that the stiffening strip 20 extends with minor curvatures between its two ends 30 and 32. The shape of the stiffening strip 20 shown in FIGS. 2 and 3 is used preferably when the positioning strap needs to be bent out from the plane of the rear wall relatively far. In the bent-out condition the positioning strap 12 is supported by the stiffening strip 20.

In FIG. 4 the frame 7 is apparent with a stiffening strip 20 in accordance with a second embodiment. In this embodiment too, the positioning strap 12 together with the stiffening strip 20 is stamped out of the material of the rear wall 10 so that directly after stamping the positioning strap 12 together with the stiffening strip 20 extends in the same plane as the rear wall 10. The second embodiment differs from the first embodiment by the stiffening strip 20 being oriented with only one bend between its end 30 connected to the rear wall 10 and its end 32 connected to the positioning strap 12, i.e. except for the portions in the vicinity of the ends 30 and 32 the centerline x of the stiffening strip 20 is curved in one direction only. In this embodiment too, the length of the stiffening strip 20, as measured along the centerline x, is significantly longer than the distance between the end 30 and the end 32 of the stiffening strip 20 as measured parallel to the centerline y. When the positioning strap 12 is bent out of the plane of the rear wall, the end 32 of the stiffening strip 20 connected to the positioning strap 12 is moved away from its end 30 connected to the rear wall 10, i.e. the stiffening strip 20 is thus stretched. FIG. 5 shows the condition in which the positioning strap 12 is completely bent out. The two ends 30 and 32 of the stiffening strip 20 are now spaced away from each other to such an extent that the stiffening strip has been practically pulled straight, merely a minor remaining curvature of the centerline x being evident. In this condition too, the positioning strap 12 is optimally supported by the stiffening strip 20.

The shape of the stiffening strip 20 depicted in FIGS. 4 and 5 is used with preference when the positioning strap needs to be bent out of the plane of the rear wall only relatively slightly. Here, the difference to the first and second embodiments is that in the case of the second embodiment the stiffening strip 20 is connected to the rear wall 10 or positioning strap 12 off-center with respect to the centerline y. Although this has no effect on the extension of the stiffening strip 20 it results, however, in better possibilities as regards the cutting gap and the minimum width of the stiffening strip.

What is claimed is:

1. A frame for a belt retractor of a vehicular seat belt system, including two side parts, a rear wall connecting said side parts to each other, and a positioning strap having a first end connected to said rear wall and a second end, said second end being provided with a stiffening strip which in turn is connected to said rear wall, said positioning strap extending in a plane defined by said wall, said stiffening strip having an end connected to said positioning strap and an end connected to said rear wall, said stiffening strip having a length which, as measured along a centerline of said stiffening strip, is no longer than a distance between said end connected to said positioning strap and said end connected to said rear wall, said stiffening strip extending between said end connected to said positioning strap and said end connected to said rear wall in said plane defined by said rear wall, said stiffening strip extending meander-like between said end connected to said positioning strap and said end connected to said rear wall.

2. A frame for a belt retractor of a vehicular seat belt system, including two side parts, a rear wall connecting said side parts to each other, and a positioning strap having a first end connected to said rear wall and a second end, said second end being provided with a stiffening strip which in turn is connected to said rear wall, said positioning strap, with respect to said plane defined by said rear wall, extending on a side facing away from said side parts, said positioning strap extending parallel to said plane defined by said rear wall except for a connecting portion connecting said first end of said positioning strap to said rear wall, said stiffening strip extending substantially elongated between said end connected to said positioning strap and said end connected to said rear wall, said stiffening strip, when viewed in a direction perpendicular to the plane of said rear wall, being curved in a single direction only between said end connected to said positioning strap and said end connected to said rear wall.

3. An apparatus comprising:

a vehicle seat belt retractor for a vehicle seat belt system, said seat belt retractor comprising a frame, said frame including two side parts, a rear wall connecting said side parts to each other, and a positioning strap having a first end connected to said rear wall and a second end, said second end being provided with a stiffening strip which in turn is connected to said rear wall.

4. The apparatus of claim 3, wherein said positioning strap, with respect to said plane defined by said rear wall, extends on a side facing away from said side parts.

5. The apparatus of claim 3, which is stamped and bent starting from a flat sheet of metal, said stiffening strip being obtained by stretching an S-shaped or C-shaped curved part.

6. An apparatus comprising:

a vehicle seat belt retractor for a vehicle seat belt system, said seat belt retractor comprising a frame, said frame including two side parts, a rear wall connecting said side part to each other, and a positioning strap having a first end connected to said rear wall and a second end, said second end being provided with a stiffening strip which in turn is connected to said rear wall, said positioning strap extending in a plane defined by said wall.

7. The apparatus of claim 6, wherein said stiffening strip has an end connected to said positioning strap and an end connected to said rear wall, said stiffening strip having a length which, as measured along a centerline of said stiffening strip, is longer than a distance between said end connected to said positioning strap and said end connected to said rear wall.

8. The apparatus of claim 7, wherein said stiffening strip extends between said end connected to said positioning strap and said end connected to said rear wall in said plane defined by said rear wall.

9. An apparatus comprising:

a vehicle seat belt retractor for a vehicle seat belt system, said seat belt retractor comprising a frame, said frame including two side parts, a rear wall connecting said side part to each other, and a positioning strap having a first end connected to said rear wall and a second end, said second end being provided with a stiffening strip which in turn is connected to said rear wall, said positioning strap, with respect to said plane defined by said rear wall, extending on a side facing away from said side parts, said positioning strap extending parallel to said plane defined by said rear wall except for a connecting portion connecting said first end of said positioning strap to said rear wall.

10. The apparatus of claim 9, wherein said stiffening strip extends substantially elongated between said end connected to said positioning strap and said end connected to said rear wall.

* * * * *